Patented Apr. 22, 1941

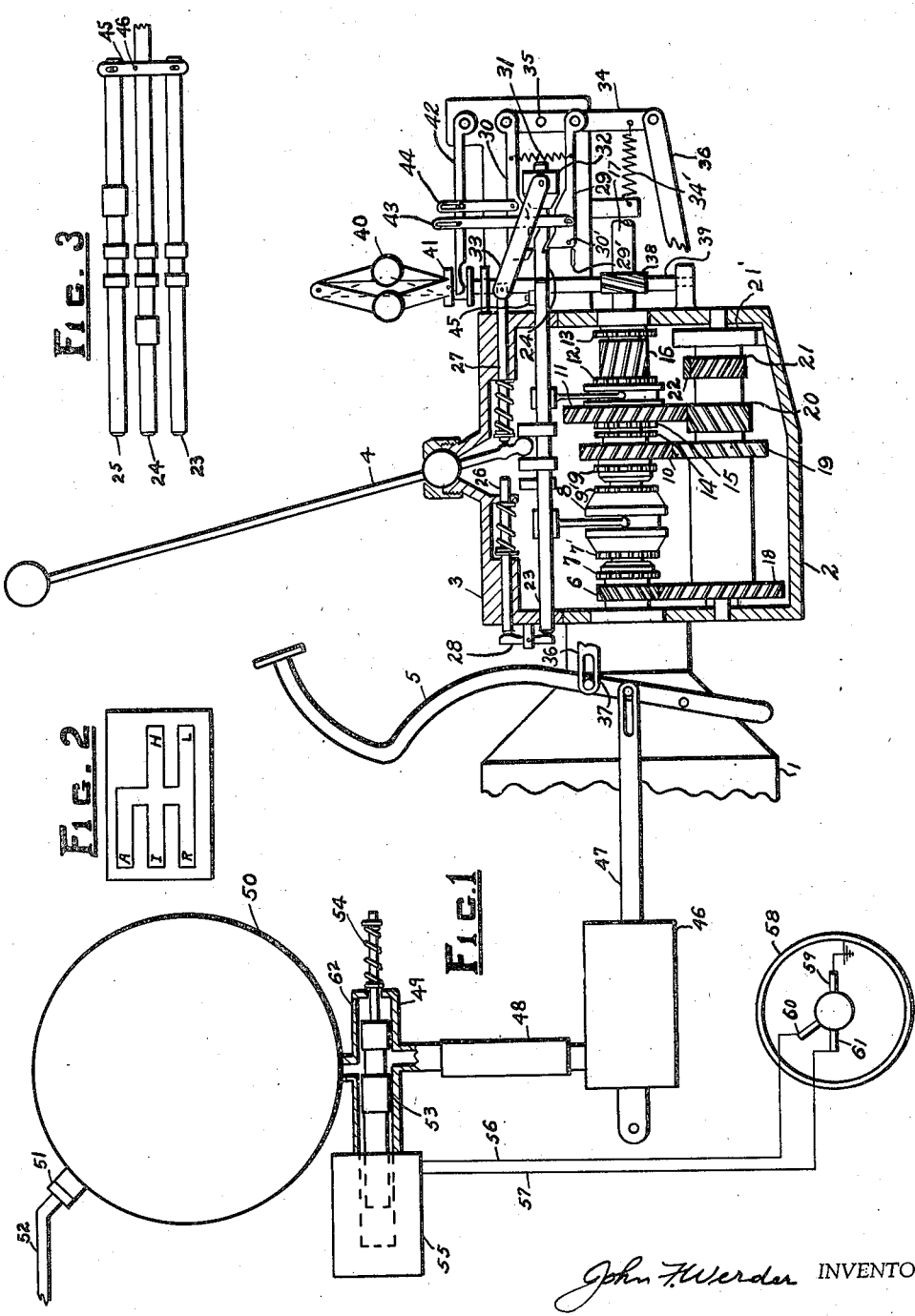

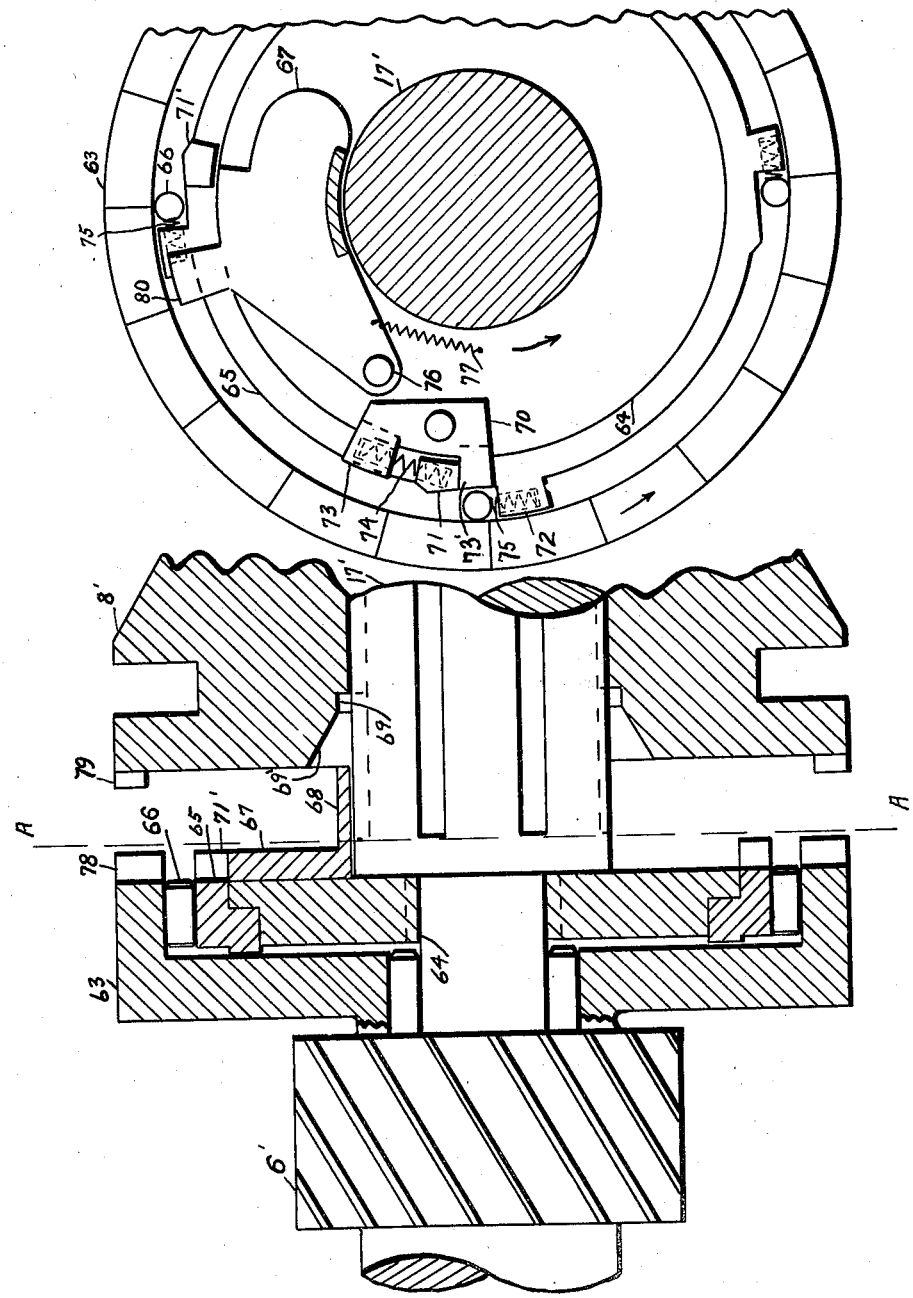

2,239,182

UNITED STATES PATENT OFFICE 2,239,182

AUTOMATIC TRANSMISSION

John F. Werder, Lakewood, Ohio

Application November 3, 1937, Serial No. 172,513

3 Claims. (Cl. 74—334)

This invention has to do with automatic transmissions and is particularly adapted to autos, trucks, busses, etc.

One of the objects is to provide means so that driving is greatly simplified and the operator needs only accelerate or apply the brake. Another object is to retain absolute control of the car and its shifting for the driver. He dictates every shift but without touching the gear shift lever. Another object is to provide a clutch engaging and disengaging device that operates automatically, but still within the driver's discretion. Still a further object is to provide means which will prevent the car's backing down hill after stopping. My unique arrangement also operates to keep the car from going forward if the operator desires to back up hill. Other objects will be evident from the following description.

It is very inexpensive to make, particularly for original factory equipment. Further, its parts can be made interchangeable with several standard parts in present day transmissions so that it can be sold and installed as an accessory on cars not originally so equipped.

In the drawings—

Fig. 1 shows my device incorporated in a standard transmission. It also shows the vacuum clutch connected so as to utilise my improved control.

Fig. 2 is a diagram of the path described by the gear shift lever. It will be noted that low, intermediate, reverse, high and neutral are standard. I add one additional position, labelled A in the diagram which represents the position of the gear shift lever for automatic operation.

Fig. 3 is a top view of the two shifting levers and forks usually used. It will be noted that in my device a third rod and rocker has been added.

Fig. 4 is a view of my automatic dog clutch mechanism which engages high without clashing or using the motor clutch.

I shall now explain my invention in detail.

In Fig. 1 numeral 1 is the clutch or bell housing and 2 is the transmission case and 3 the cover which holds the gear shift lever 4. 5 is the clutch release pedal. (Drawn in one piece for simplicity.) 6 is the main shaft and main gear to which is attached high gear dog clutch 7. 7' mates with 7 and is part of selector 8 which also carries a similar mating part 9' for engagement with intermediate dog clutch 9 attached to gear 10. 11 is low and reverse gear to which is attached dog clutches 15 and 12. 13 and 14 are corresponding dog clutches which are rigidly splined to driven shaft 17. 16 is a spirally splined sleeve upon which gear 11 is moved laterally. This sleeve is attached to shaft 17 thru an overrunning clutch located between it and said shaft. This overrunning clutch permits the gear 11 to drive shaft 17 to propel the car forward but shaft 17 cannot drive gear 11.

18 is the main countershaft gear—19, 20, 21 and 22 are intermediate, low and reverse gears respectively, all gears 18, 19, 20 and 21 being mounted on one shaft so they turn together, as is well known. 23, 24 and 25 are gear shifter rods, 23 being one I have added to the conventional transmission. 26 and 27 are additional rods I have added. 28 is a rocker arm which moves rod 26 to the right when rod 24 is shifted to the left and when gear shift lever 4 is returned to neutral position, 24 is likewise restored to neutral. 29 and 30 are shifter ratchet arms which actuate rod 24 thru notches. 29' is a guide which cooperates with pin 30' in lever 29 to prevent interference. Lever 30 is similarly supplied so that lever 30 will not catch in upper groove of rod 24, while lever 29 is pushing rod 24 to the left. On the return motion, guide 29' and pin 30' hold lever 29 from falling into lower groove. Guide and pin for lever 30 are not shown for simplicity, but their function and construction are duplicates of the lower set.

31 is a spring which tries to hold levers 29 and 30 in position to engage grooves on shaft 24. 32 is a disengaging sleeve which, thru straps 33 is moved by shaft 27. 34 is a rod fulcrumed at 35 to which are attached levers 29 and 30. 36 is a connecting rod which moves 34 when clutch is completely disengaged. Slot 37 keeps this rod from moving until clutch is fully disengaged.

As the above parts complete one phase of my transmission, I shall explain its operation thus far and later explain the additional automatic features.

The car may be driven by the gear shift lever and clutch in the usual way, by handling these units in the regular manner. However, by placing gear shift lever to the extreme right (from the driver's seat) and pushing it forward, the car may be started and stopped and shifted into high gear without touching the gear shift lever. This putting of the gear shift into automatic position (A in Fig. 2) moves rod 23 to the right which thru lever 45, pivoted at 46, and this in turn moves low gear 11 into position as shown in drawing. It will be noted that pivot 46 is not in the center of lever 45. This is to prevent low gear going in far enough to engage dog clutches 14 and 15. For this reason the car is in free wheeling low gear, and by letting the clutch in, the car will move forward. It may be accelerated and with modern high speed motors and helical gears, a speed of 20 or 25 M. P. H. can be obtained without strain on the motor or objectionable noise to operator. By throwing the clutch clear out, rod 37 moves 34 which in turn pushes synchronising clutch (or selector) 8 to the left and engages dog clutches 7 and 7'. The clutch may now be released and the car is in high gear. As most shifts to high are made between 15 and 20 M. P. H. this two speed drive is sufficient for nearly all driving.

Now suppose the operator stops the car. He disengages his clutch, and if he wishes to shift into low for his next start he merely pushes it clear out and this, thru 36 and 34 and thru lever 30 pulls shaft and selector 8 into neutral position, as shown in the drawings.

If, at any time, the operator wishes to operate gear shift lever 4 himself he may do so. Putting this lever into neutral position automatically "clears" the transmission. 32 is pulled to the left which spreads ratchet levers 29 and 30 so that further movement of the clutch can have no effect upon gear shifter rods. Also, if transmission happens to be in automatic high when operator moves gear shift lever to neutral position, rod 26 thru rocker arms 28 pushes rod 24 and selector 8 to neutral position. Operator can now shift in the usual manner. It is to be noted that all of this "clearing" of the automatic features are done instantly upon movement of the gear shift lever to any position except automatic. (A in Fig. 2.) This prevents confusion and possible accidents, because as most drivers have handled a gear shift lever for years it is conceivable that in times of stress they may revert to habits and customs well established.

When driving a car with my transmission in the automatic position, the operator's hands are not required for anything but guiding the car. The amount of pressure at the bottom of the clutch stroke required for shifting, while not great, is, nevertheless sufficient that the shift is not made accidentally. The operation is learned in a few minutes by the average driver.

Free wheeling has not been a success in the past. In fact I know of no car that now supplies it. There was considerable danger coincident with its use because we are all depending upon the deceleration caused by the car driving the motor when the throttle is closed. In my transmission, I utilise one good feature of free wheeling and that is the lack of sudden deceleration caused in low gear when the throttle is closed. This is not only objectionable, but very hard on the car.

When gear shift lever in my transmission is placed in conventional low or reverse, gear 11 is moved far enough that dog clutches 14 and 15 or 12 and 13 (in reverse) engage and free wheeling clutch in sleeve 16 is inoperative. Thus low gear may be used for braking down steep grades.

I shall now go on to the more automatic features of my transmission.

38 is a spiral gear attached to shaft 17 which drives governor shaft 39 thru a companion gear (not shown). This shaft carries governor at the top which is of any suitable type. The one illustrated has weights 40 and sliding sleeve 41 which travels up and down with an increase or decrease in speed. Lever 42 is likewise moved up and down. Rods 43 and 44, attached to levers 29 and 30 respectively permit these ratchet arms to operate under proper conditions of speed. It will be noted that rods 43 and 44 are slotted at their ends. Under conditions of very slow speed, collar 41 is further down on shaft 39 and so lever 43 will keep ratchet lever 29 from engaging rod 24. In other words the shift into high cannot be made then. Likewise, if collar of governor is up high, thru lever 44, ratchet lever 30 will be kept from engaging rod 24 so car cannot be shifted out of high. These speed limits for each shift can be regulated to any points desired. For example, on an average car I prefer that governor hold lever 29 out of engagement until a speed of 10 M. P. H. is reached. Likewise I prefer that lever 30 be held out at speeds above 15 M. P. H.

46 represents vacuum clutch release unit which operates clutch thru rod or lever 47. This vacuum type clutch control with valve connection operating off foot throttle was put on several cars a few years ago, but it, too, has largely fallen into the discard because it did not function very well. If the motor started to stall, it was natural for the operator to give it more gas. This opened the valve to clutch release cylinder and the motor was killed. It took very careful adjustments and a skilled operator to make it function very well, if at all. It operated on the wrong principle, was the reason. In my improved transmission, I do not use a throttle connection to operate the vacuum cylinder. Instead, I employ a speed controlled valve which engages the clutch only when motor speed is above a given point.

Again referring to the drawings, 48 is a flexible pipe connecting vacuum cylinder to two way valve 49, which, in turn is connected to vacuum reservoir 50. This, thru check valve 51 and pipe 52 is connected to intake manifold or other suitable vacuum means. 53 is a piston valve held in position as shown in the drawing by spring 54. This is operated by the solenoid 55 which is connected thru wires 56 and 57 to the third and un-grounded brushes of the generator 58. 59 is the grounded brush, 60 is the third brush and 61 the "live" or ungrounded brush. I have found that the voltage generated between these two brushes is practically in proportion to speed up to 2000 R. P. M. This gives me a ready built governor to operate my two way valve.

Of course a conventional governor can be employed and operate my two way valve just as well as the solenoid. Also the solenoid may be operated by brush 61 and 59, but the voltage generated here raises rather quickly to a point equalling the battery and then it flattens out. That means that the solenoid must operate at a voltage generated at a speed of about 400 or 550 R. P. M. This is often a little too slow, so by using the other connection, brushes 60 and 61 I can get any reasonable speed-engagement combination I desire.

It will be noted that if solenoid moves piston to the left, connection to vacuum reservoir is closed and air enters thru port, 62, permitting clutch to engage. If the motor speed falls below a predetermined point solenoid releases valve 53, which then returns to position as shown in drawings and vacuum in reservoir releases the clutch, permitting motor to speed up again without load until predetermined speed is again reached.

My transmission, as above outlined, is now complete and I shall now explain its fully automatic operation, with the vacuum clutch control and governor at gear box.

The motor is first started and, while the motor is running as idling speed, gear shift is moved into automatic position. The gears are now set as shown in the diagram, but the clutch is, of course disengaged by the vacuum cylinder and the car does not move. Now, operator presses on the foot throttle, the motor and generator speed up, the voltage rises and solenoid moves valve 53 to the left permitting air to enter thru port 62 and into clutch release cylinder 46. The car is now started thru low gear. Now suppose, the load is more than the motor can carry with its fuel supply. The motor speed and consequently generator voltage drops and valve 53 again closes port 62 but connects vacuum reservoir 50 with clutch release cylinder so motor does not stall but has another chance to speed up. By now the operator feeds more gas and the car moves forward once more. During these two starts, car speed has not been sufficient to raise governor collar 41 so arm 43 has held ratchet lever 30 out of engagement with shift rod 24. Therefor the release of clutch to prevent motor stalling did not shift gears. After a speed of, say 15 M. P. H., has been reached, operator releases foot throttle momentarily. Motor speed slows down, vacuum control releases clutch and ratchet rod 29 moves to the left carrying rod 24 which shifts selector 8 into high gear position. Car speed has not been checked meanwhile due to over running clutch in hub 16. As the motor must necessarily slow down before clutch is released, shafts 6 and 17 are always running at nearly the same speed. Therefore shift can be made rapidly without clashing of clutches 7 and 7'. If now the operator has the car running at sufficient speed to raise collar 41 so that ratchet lever 30 is raised away from shaft 24 and for some reason he releases the clutch with his foot, the car will still stay in high gear. However, he need not touch the clutch for perfect functioning of my transmission. If his speed is below the predetermined setting, say 15 M. P. H. and he releases the foot throttle, clutch will release and selector 8 will be drawn back to its neutral position as shown in the drawings. The car is then in free wheeling low and as soon as the motor is speeded up again by acceleration it will drive the car in low gear. Some times, in traffic particularly, several short runs in low are required and the car does not get going fast enough to need any other gear. In this case, governor 40 will hold ratchet lever 29 out of engagement with rod 24 and no shift will be made, regardless of repeated engagement and disengagement of the clutch.

At any time the operator wishes, he may take over complete control of the gear shift by simply moving gear shift lever out of automatic position. He can also take over the clutch operation by a suitable button on the dash which pushes valve 53 to the left and locks it there. It will be noted that I have shown a design of gear shift travel here that puts the gear shift lever to the right and forward from the driver. This gets it out of the way, but no particular ingenuity would be required to make the necessary alterations to locate this position elsewhere.

In a modification of my transmission, I use an automatic self synchronising clutch in place of dog clutches 7 and 7'. This is shown in an enlarged view under Fig. 4. Parts of this which correspond to similar numbers in Fig. 1 are indicated by numbers 6' and 8' and 17'. 63 is the outer roller housing of a ratchet clutch or free wheeling unit and 65 is the hub upon which is mounted the cam portion 65. 66 is one of the rollers and 71' is one of the protruding stops which are a part of 65. 67 is a combination governor weight and locking lever pivoted at 76 and pulled toward the shaft 17' by spring 77. Tooth 80 on the outer edge of 67 engages teeth 78 on 63 when speeds are right and synchronised. 70 is a block suitably attached to hub 64, which thru stops 73 and 73' limit the travel of stop 71 which is a part of cam 65. Spring 74 holds it in the position as shown in the drawing and its companion lug 71' then keeps 67 and 80 from flying outward due to centrifugal force. Springs 75 keep roller in contact with cam and outer ring 63. 68 is a projection on 67 which, thru bevel 69' and annular space 69 enable selector 8' to keep 67 inactive when 8' is moved to the left. Further movement to the left engages dog clutch teeth 79 and 78 making a solid connection or coupling.

The left hand drawing is, of course in section, and the right hand is a view facing a section taken thru A—A.

It will be noted that the free wheeling roller clutch I employ is so made that its action is reversed from that normally used. The car drives shaft 17' in the direction of the arrow. This causes rollers 66 to engage and so the car drives the motor. Spring tension of 77 is set so that the weight and clutch 80 cannot fly out until a suitable speed is attained. Suppose this speed is 15 M. P. H. At speeds below this the car will drive the motor but the motor will not drive the car thru this clutch. At speeds above this, the rollers engage and the load is sufficient that spring 74 is compressed and cam 65 slips until stop 71 hits stop 73. By this time 71' has also moved so that 67 is no longer held from flying out by centrifugal force so tooth 80 engages 78 and now motor will drive the car and the car will also drive the motor. If the motor slows down so the car speed is again below 15 M. P. H. tooth 80 will disengage, spring 74 will move cam 65 back to the position shown in drawings and motor will no longer drive the car.

Of course, in actual practice I use multiple levers and teeth 67 and 80 to preserve balance and give necessary strength. I have shown only one on the drawings for the sake of simplicity. Also, the spaces between teeth 78 are considerably larger than teeth 80 as any play is quickly taken up by free wheeling clutch anyway. I prefer to use four or six parts like 67 and so locate them with reference to spaces between teeth 78 that half will always engage, altho this is not necessary.

Also I have not shown synchronising surfaces between 63 and 8'. These are of no value for automatic operation, but are convenient for hand shifting. This can readily be incorporated, however.

In utilising my automatic self synchronising clutch, I substitute it for the corresponding parts shown in Fig. 1 and leave off governor 40 together with ratchet levers 29 and 30 and all other parts which disengaged 8 thru shaft 24. With gear shift in automatic position and motor clutch engaged car is driven thru low gear. When accelerated above 15 M. P. H. (or speed at which clutch weights are set) and foot throttle released, the motor speed slows down until it is less than car speed and my clutch engages. From now on car is in high gear. Shift to low is made by letting the car slow down below 15

M. P. H. and then accelerating. Of course my vacuum clutch may be used or not with this self synchronising clutch.

I now come to a very important feature of my device, which I felt best to entirely eliminate from the description until all other features were explained. This is a device to prevent the car's backing down hill with the clutch disengaged. In Fig. 1 numeral 21 represents an overrunning clutch attached to cluster gear countershaft and locked securely to housing 2. The clutch rollers and cams are so arranged that countershaft may travel in a forward direction only. Placing it here has several advantages to putting in on the propeller shaft (as has been done). No disconnecting arrangement is needed to permit backing or moving the car without motor. Placed upon the countershaft it functions backwards as well as forward. For example if the car is being backed up a hill backwards the clutch functions here and prevents it from running down hill forward. Another advantage is that it runs at about half the speed of the propeller shaft, thus reducing wear and friction.

It is understood that I do not limit my invention to the exact examples or installations herein set forth. I also do not wish to limit its use to automotive vehicles. It can be used on lawn mowers or any place where an automatic action is required.

What I claim is:

1. In a transmission consisting of a drive shaft, a driven shaft, a countershaft driven by said drive shaft, intermediate gearing driven from said countershaft and direct coupling means for connecting said drive and driven shafts, a free wheeling splined hub mounted on said driven shaft, a pair of dog clutches mounted on said driven shaft and at each end of said free wheeling hub, low and reverse gear slidably mounted on said hub, a pair of dog clutches attached to each side of said low and reverse gear, so that in reverse and one low gear position one pair of dog clutches engage to establish solid drive between said gear and driven shaft, and in one low gear position free wheeling connection only is established.

2. In transmission mechanism, a drive and driven shaft, direct coupling means for connecting said shafts, a countershaft driven by said drive shaft, intermediate gearing driven from said countershaft, a free wheeling splined hub mounted on said driven shaft, a dog clutch mounted on said driven shaft at each end of said hub, a low and reverse gear slidably mounted on said hub, a dog clutch on each side of said gear, so that when said gear is moved to either end of said hub, said dog clutches will cooperate and provide solid connection between said gear and driven shaft, but when said gear is away from either end, free wheeling connection between said gear and driven shaft is established.

3. In transmission mechanism, a drive shaft, a driven shaft, direct coupling means for said shafts, a countershaft driven by said driveshaft, intermediate gearing driven from said countershaft, a low and reverse gear mounted on said driven shaft through free wheeling and dog clutch means so that when said gear is in position for reverse drive dog clutch means is engaged, in neutral or one low gear position free wheeling means is employed and in another low gear position dog clutch means is engaged providing solid low gear drive, means for establishing direct drive between said drive and driven shafts while said gear is in free wheeling low gear position.

JOHN F. WERDER.